United States Patent [19]

Takeda et al.

[11] 4,342,852

[45] Aug. 3, 1982

[54] SETTING TYPE RESIN COMPOSITION CONTAINING A SUBSTANTIALLY LINEAR, HIGH-MOLECULAR-WEIGHT NOVOLAK SUBSTITUTED PHENOLIC RESIN

[75] Inventors: Nobuyuki Takeda; Tadao Iwata, both of Iwakuni, Japan

[73] Assignee: Mitsui Petrochemical Industries, Ltd., Tokyo, Japan

[21] Appl. No.: 221,354

[22] Filed: Dec. 29, 1980

[30] Foreign Application Priority Data

| Dec. 27, 1979 | [JP] | Japan | 54-169140 |
|---|---|---|---|
| Jun. 3, 1980 | [JP] | Japan | 55-73754 |
| Jun. 3, 1980 | [JP] | Japan | 55-73755 |
| Jun. 3, 1980 | [JP] | Japan | 55-73756 |
| Jun. 3, 1980 | [JP] | Japan | 55-73757 |

[51] Int. Cl.³ .............................................. C08L 63/02
[52] U.S. Cl. .................................. 525/481; 525/422; 525/456; 525/497; 525/498; 525/501
[58] Field of Search ............... 525/481, 501, 422, 456, 525/497, 498

[56] References Cited

U.S. PATENT DOCUMENTS 4,260,704  4/1981  Schmidt et al. ...................... 525/501

*Primary Examiner*—Theodore E. Pertilla
*Attorney, Agent, or Firm*—Sherman & Shalloway

[57] ABSTRACT

Disclosed is a setting type resin composition comprising (A) a setting type resin and (B) 10 to 200 parts by weight, per 100 parts by weight of said resin (A), of a substantially linear, high-molecular-weight novolak type substituted phenolic resin which comprises a constituent phenol component comprised mainly of a bifunctional phenol and has a number average molecular weight of at least 1500. This resin composition has highly improved heat resistance and mechanical strength characteristics by virtue of incorporation of the high-molecular-weight novolak type substituted phenolic resin, and this improving effect is especially prominent when an epoxy resin is used as the setting type resin.

15 Claims, No Drawings

SETTING TYPE RESIN COMPOSITION CONTAINING A SUBSTANTIALLY LINEAR, HIGH-MOLECULAR-WEIGHT NOVOLAK SUBSTITUTED PHENOLIC RESIN

BACKGROUND OF THE INVENTION (1) Field of the Invention

The present invention relates to a setting type resin composition excellent in the heat resistance and mechanical properties. More particularly, the present invention relates to a setting type resin composition having highly improved heat resistance and mechanical properties, which comprises a setting type resin and a substantially linear, high-molecular-weight novolak type substituted phenolic resin, optionally together with an inorganic filler.

(2) Description of the Prior Art

Setting type resins such as epoxy resins, urethane resins, urea resins, melamine resins and phenolic resins are ordinarily used in the form of setting type resin compositions formed by adding curing agents and, if necessary, inorganic fillers to these setting resins, and these resin compositions are used for manufacture of various molded articles through molding and curing. Although cured products of these setting type resin compositions are excellent in the mechanical properties at relatively low temperatures approximating to normal temperatures, they are inferior in the heat resistance and mechanical characteristics at high temperatures such as thermal distortion temperatures, the thermal distortion resistance, flexural strength, mechanical strength and dimension stability. Therefore, these setting type resin compositions cannot be utilized for manufacture of molded articles to be used under heating conditions.

As means for improving the heat resistance and mechanical characteristics and other properties of these setting type resin compositions, there have been proposed various setting resin type compositions formed by incorporating resol type phenolic resins or novolak type phenolic resins into setting type resins. For example, setting type resin compositions comprising an epoxy resin as the setting type resin and a novolak type phenolic resin incorporated therein are proposed in Japanese Patent Publications Nos. 9246/57, 11827/63, 3574/64, 27769/64, 1352/66, 30351/70, 38030/71, 8278/73, 44958/73, 19319/75, 20537/76, 21679/76, 21839/76, 24399/76, 43403/76, 3828/77, and 9480/77, and Japanese Patent Application Laid-Open Specifications Nos. 72293/73, 118797/74, 118798/74, 70497/75, 108400/75, 132267/76, 138599/77, 144099/77 and 29532/80. Novolak type phenolic resins incorporated in these known epoxy resin compositions are those prepared according to the conventional methods and their number average molecular weights are relatively low, for example, ordinarily lower than 1000 and about 1200 at highest. Even if these novolak type phenolic resins having a relatively low molecular weight are incorporated into epoxy resins, it is impossible to sufficiently improve the heat resistance and mechanical characteristics at high temperatures such as heat distortion temperatures, the heat distortion resistance, flexural strength, mechanical strength and dimensional stability, in the resulting epoxy resin compositions. Furthermore, even if such novolak type phenolic resins having a relatively low molecular weight are incorporated into setting type resins other than epoxy resins, for example, urethane resins, urea resins, melamine resins and phenolic resins, it is impossible to sufficiently improve the heat resistance and mechanical characteristics in the resulting setting type resin compositions.

BRIEF SUMMARY OF THE INVENTION

We made researches with a view to developing a process for highly improving the heat resistance and mechanical characteristics of a setting type resin composition comprising a setting type resin such as an epoxy, urethane or phenolic resin, a novolak type or resol type phenolic resin and if necessary and an inorganic filler, we found that this object can be attained if a substantially linear, high-molecular-weight novolak type substituted phenolic resin having a number average molecular weight Mn of at least 1500 is incorporated and the resulting setting resin composition is cured. We have now completed the present invention based on this finding.

The setting type resin composition of the present invention is characterized in that this setting resin composition is highly improved over the setting type resin compositions comprising an ordinary novolak type phenolic resin having a relatively low molecular weight, such as proposed in the above-mentioned literature references, in the heat resistance and mechanical characteristics at high temperatures such as the heat distortion temperatures, the heat distortion resistance, flexural strength, mechanical strength and dimensional stability.

In accordance with the present invention, there is provided a setting type resin composition comprising (A) a setting type resin and (B) 10 to 200 parts by weight, per 100 parts by weight of said resin (A), of a substantially linear, high-molecular-weight novolak type substituted phenolic resin which comprises a constituent phenol component comprised mainly of a bifunctional phenol and has a number average molecular weight of at least 1500.

DETAILED DESCRIPTION OF THE PREFERRED EMBODIMENTS

As the setting type resin (A) that is incorporated into the setting type resin composition of the present invention, there can be mentioned a setting type resin which is cured by a curing agent and, if necessary, a curing promotor and a setting type resin which is cured by the action of heat. More specifically, there can be mentioned various epoxy resins, various urethane resins, urea resins, melamine resins, polybismaleimide resins, ordinary novolak type phenolic resins and ordinary resol type phenolic resins. Among these setting type resins (A), those capable of being cured by a phenolic hydroxyl group-containing compound are especially preferred because the heat resistance and mechanical characteristics are especially prominently improved in the resulting setting type resin compositions. More specifically, it is preferred that an epoxy resin, a urethane resin, an ordinary novolak type phenolic resin or an ordinary resol type phenolic resin be used as the setting type resin (A), because the heat resistance and mechanical characteristics are especially prominently improved in the resulting setting type resin composition. Highest improvements of the foregoing characteristics are attained when an epoxy resin is used as the setting type resin (A). Therefore, it is most preferred in the present invention that an epoxy resin be used as the setting type resin (A).

The epoxy resin and urethane resin that are used as the setting type resin (A) in the present invention will now be described in detail.

In the case where the setting type resin (A) that is incorporated in the setting type resin composition of the present invention is an epoxy resin, the epoxy resin used is a compound containing at least 2 epoxy groups in the molecule. As such epoxy resin, there can be mentioned, for example, epoxy resins of glycidyl ethers of polyphenol compounds such as bisphenol A, bisphenol F and 1,1,2,2-tetrakis(4-hydroxyphenyl)ethane; epoxy resins of glycidyl ethers of nuclear hydration products of the above-mentioned polyphenol compounds; epoxy resins of glycidyl ethers of polyhydric phenols such as catechol, resorcinol, hydroquinone and phloroglucinol; epoxy resins of glycidyl ethers of polyhydric alcohols such as ethylene glycol, butane diol, glycerol, erythritol and polyoxyalkylene glycol; novolak type epoxy resins; alicyclic epoxy resins such as vinylcyclohexene dioxide, limonene dioxide and dicyclopentadiene dioxide; epoxy resins of polyglcidyl esters of condensates of polycarboxylic acids such as phthalic acid and cyclohexane-1,2-dicarboxylic acid; polyglycidyl amine type epoxy resins; and methylepichlorohydrin type epoxy resins. Among these epoxy resins, an epoxy resin of a glycidyl ether of a polyphenol compound and a novolak type epoxy resin are preferred, and an epoxy resin of a glycidyl ether of bisphenol A or bisphenol F is especially preferred.

All the compounds known as curing agents for epoxy resins can be incorporated into the setting type resin composition containing an epoxy resin such as mentioned above. For example, there can be mentioned linear aliphatic polyamines such diethylene triamine, triethylene tetramine, tetraethylene pentamine, dipropylene diamine and diethylaminopropylamine; cyclic aliphatic polyamines; aliphatic polyamine adducts; ketoimines; modified aliphatic polyamines; polyamideamines; aromatic amines; aromatic modified amines; aromatic modified polyamines; tertiary amine type curing agents, mercaptan type curing agents; acid anhydride type curing agents; copolymers containing an acid anhydride group, such as an ethylene/maleic anhydride copolymer; compounds containing a phenolic hydroxyl group, such as novolak type or epoxy type phenolic resin precondensates; and compounds such as dicyandiamide and melamine.

When the setting type resin (A) incorporated in the setting type resin composition of the present invention is a urethane resin, there can be used a resin having a urethane linkage formed from a polyisocyanate and a polyether polyol, polyester polyol or other polyol compound, and a resin having a urethane linkage formed from a urethane prepolymer and a curing agent.

As the polyisocyanate constituting the urethane resin, there can be mentioned, for example, hexamethylene diisocyanate, xylylene diisocyanate, 1-methyl-2,4-diisocyanate, cyclohexane phenylene diisocyanate, tolylene diisocyanate, chlorophenylene diisocyanate, diphenylmethane-4,4'-diisocyanate, naphthalene-1,5-diisocyanate, triphenylmethane-4,4',4''-triisocyanate, xylylene-2,2'-diisocyanate, isopropylbenzene-2,4-diisocyanate, an adduct of 1 mole of trimethylol propane and 3 moles of tolylene diisocyanate, and high-molecular-weight polyisocyanates obtained by polymerization of the foregoing polyisocyanates.

The polyol compound constituting the urethane resin is a compound having at least 2 hydroxyl groups in the molecules. As such hydroxyl group-containing compound, there can be mentioned, for example, polyether polyols such as polyethylene glycol, polyoxypropylene glycol and poly(oxyethylene/oxypropylene) glycol; hydrolysis products of copolymers of α-olefins with organic carboxylic acid unsaturated esters; polyester type polyols having terminal hydroxyl groups, which are prepared from polybasic acids and glycols; acrylic polyols; castor oil-derived polyols and tall oil-derived polyols; polybutadiene, polystyrene and butadiene/acrylonitrile copolymers having hydroxyl groups at both the molecule terminals; hydroxyl group-containing epoxy resins; modified hydroxyl group-containing epoxy resins; and hydroxyl group-containing compounds formed by reacting a polyisocyanate with an excessive amount of a polyol compound.

The urethane prepolymer constituting the urethane resin is a compound having at least 2 isocyanate groups in the molecule, which is obtained by reacting a polyol compound with an excessive amount of a polyisocyanate.

As the curing agent to be added to the resin having a urethane linkage according to need, there can be used curing agents customarily used for urethane prepolymers. More specifically, there can be mentioned, for example, polyamines such as ethylene diamine, diethylene triamine, triethylene tetramine, tetraethylene pentamine, propylene diamine, tetramethylene diamine, and mixtures of two or more of the foregoing polyamines. Furthermore, the above-mentioned polyol compounds singly or in the form of a mixture of two or more of them.

The high-molecular-weight novolak type substituted phenolic resin (B) to be incorporated in the setting type resin composition of the present invention is a substantially linear, high-molecular-weight novolak type substituted phenolic resin which comprises a constituent phenol component comprised mainly of a bifunctional phenol and has a number average molecular weight $\overline{Mn}$ of at least 1500 as determined according to the vapor pressure osmometry in N,N-dimethylacetamide as the solvent.

The high-molecular-weight novolak type substituted phenolic resin (hereinafter referred to as "high-molecular-weight novolak type resin") used in the present invention may be comprised of novolak type recurring units, all of which are substantially linear or it may contain intervening or bridging groups consisting of a divalent hydrocarbon group, which appear alternately in blocks of the novolak type recurring units having a number average molecular weight of 250 to 1200, in an amount of 0.5 to 1 mole, especially 0.66 to 1 mole, per mole of said blocks. What is important is that this high-molecular-weight novolak type resin is substantially linear and has a number average molecular weight of at least 1500, preferably 1700 to 15000, especially preferably 2000 to 10000.

By the term "substantially linear" used herein, it is meant that the molecular structure of the polymer is a linear structure including straight or branched chains but is substantially free of crosslinkages (gelled portions).

The number average molecular weight of the substantially linear high-molecular-weight novolak type resin (B) is one as determined according to the vapor pressure osmometry in N,N-dimethylacetamide as the solvent, and it is indispensable that the number average molecular weight thus determined should be at least 1500. As the number average molecular weight of the high-molecular-weight novolak type resin is increased when this resin is incorporated into the setting type resin, there is obtained a preferred setting type resin composition highly improved in the heat resistance and mechanical characteristics.

The molecular weight distribution of the high-molecular-weight novolak type resin used in the present invention is such that the content of resin components having a number average molecular weight of at least 2,000 is ordinarily at least 50% by weight, preferably at least 60% by weight and especially preferably a least 70%. The molecular weight distribution expressed as the ratio $\overline{M}w/\overline{M}n$ of the weight average molecular weight $\overline{M}w$ to the number average molecular weight $\overline{M}n$ is preferably in the range of from 1.8 to 20 and especially preferably in the resin of from 2 to 10. The melting point of the high-molecular-weight novolak type resin is ordinarily higher than 120° C. and preferably higher than 150° C.

This high-molecular-weight novolak type substituted phenolic resin comprises substantially linear novolak type recurring units formed by condensation of a phenol component containing 70 to 100 mole %, preferably 80 to 100 mole %, especially preferably 90 to 100 mole % of at least one bifunctional phenol represented by the following general formula [I]:

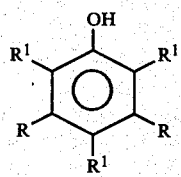

wherein two of three $R^1$'s are hydrogen atoms and the remaining one $R^1$ is an alkyl group having 1 to 8 carbon atoms, an aryl group having 6 to 10 carbon atoms, a halogen atom or a hydroxyl group, preferably an alkyl group of 1 to 8 carbon atoms, especially preferably a substituent selected from methyl, ethyl, isopropyl, sec-butyl, tert-butyl and octyl groups, and two R's, which may be the same or different, stand for a member selected from the group consisting of a hydrogen atom, an alkyl group having 1 to 8 carbon atoms, a halogen atom and a hydroxyl group, preferably one of two R's is a hydrogen atom and the remaining one group R is a hydrogen atom or an alkyl group having 1 to 8 carbon atoms, especially preferably two R's are hydrogen atoms, and up to 30 mole %, preferably up to 20 mole %, especially preferably up to 10 mole %, of a trifunctional phenol, with at least one aldehyde component represented by the following general formula [II]:

wherein $R^2$ stands for a hydrogen atom or a substituent selected from the group consisting of a methyl group and a halogenated methyl group, preferably a hydrogen atom or methyl group, especially preferably a hydrogen atom.

In the novolak type recurring units, the bifunctional phenol represented by the general formula [I] is present in the polymer molecule chain in the form of hydroxyarylene units represented by the following general formula [III]:

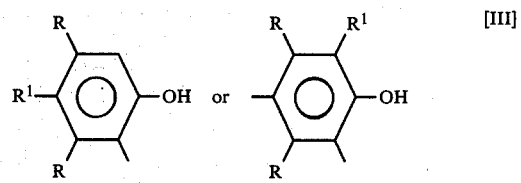

wherein $R^1$ and R are as defined above, and the bifunctional phenol of the general formula [I] is present at terminals of the polymer molecule chain in the form of hydroxyaryl units represented by the following general formula [IV]:

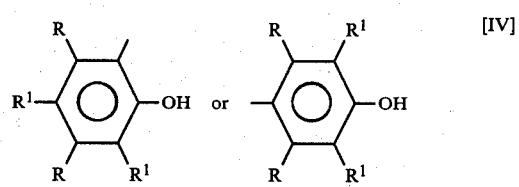

wherein $R^1$ and R are as defined above. Also the trifunctional phenol of the resin is present in the polymer molecule chain in the form of hydroxyarylene units similar to those represented by the general formula [III] and is present at terminals of the resin molecule in the form of hydroxyaryl units similar to those represented by the general formula [IV].

In the high-molecular-weight novolak type resin used in the present invention, the aldehyde represented by the general formula [II] is present in the novolak recurring units in the form of alkylidene units represented by the following general formula [V]:

wherein $R^2$ stands for a hydrogen atom or a substituent selected from the group consisting of methyl and halogenated methyl groups.

The novolak type recurring units constituting the high-molecular-weight novolak type resin form a substantially linear chain structure in which the above-mentioned hydroxyarylene units and alkylidene units are alternately arranged and connected with one another. More specifically, the structure of the novolak type recurring units constituting the high-molecular-weight novolak type resin is such that when the phenol is comprised solely of the bifunctional phenol represented by the general formula [I], the resin is linear and if the content of the trifunctional phenol is increased, the resin sometimes has a branched structure. The ratio of the aldehyde component to the total phenol component in the novolak type recurring units is such that the amount of the aldehyde component is ordinarily in the range of from 0.90 to 1.0 mole, preferably from 0.93 to 1.0 mole, per mole of the total phenol component. Ordinarily, the novolak type recurring units are free of a methylol group, but they may comprise a methylol group in a minute amount, for example, up to 0.01 mole per mole of the total phenol component.

In the phenol component in the novolak type recurring units constituting the high-molecular-weight novolak type resin (B), the bifunctional phenol is a phenol represented by the above general formula [I] having on the benzene nucleus two hydrogen atoms active to the substitution reaction. More specifically, the bifunctional phenol is a phenol of the general formula [I] which has an alkyl group having 1 to 8 carbon atoms, an aryl group having 6 to 10 carbon atoms, a halogen atom or a hydroxyl group at the ortho- or para-position to the hydroxyl group. For example, there can be mentioned ortho- and para-isomers of alkylphenols such as cresol, ethylphenol, n-propylphenol, isopropylphenol, n-butyl-phenol, sec-butylphenol, tert-butylphenol, sec-amyl-phenol, tert-amylphenol, hexylphenol, heptylphenol and octylphenol, halogenated phenols such as fluorophenol, chlorophenol and bromophenol, and arylphenols such as phenylphenol and tolylphenol. Furthermore, as the bifunctional phenol represented by the above general formula [I], there can be mentioned 2,3-xylenol, 3,4-xylenol, 2,5-xylenol, 2,3-diethylphenol, 3,4-diethylphenol, 2,5-diethylphenol, 2,5-diethylphenol, 2,3-diisopropylphenol, 3,4-diisopropylphenol, 2,5-diisopropylphenol, 2,3-dichlorophenol, 3,4-dichlorophenol, 2,5-dichlorophenol, 2-methyl-3-phenylphenol, 3-methyl-4-phenylphenol and 2-methyl-5-phenylphenol. The bifunctional phenol component in the novolak type recurring units constituting the high-molecular-weight novolak type resin (B) is at least one member selected from the above-mentioned phenols, and it may be a mixture of two or more of the foregoing phenols.

The trifunctional phenol which may be contained in the novolak type recurring units constituting the high-molecular-weight novolak type resin (B) is a phenol having on the benzene nucleus three hydrogen atoms active to the substitution reaction, and as such trifunctional phenol, there can be mentioned phenol, meta-substituted phenols and 3,5-substituted phenols. As substituents which such trifunctional phenol has at the meta- or 3,5-positions, there can be mentioned alkyl groups, halogen atoms and hydroxyl groups. Among these trifunctional phenols, those represented by the following general formula [VI] are preferred:

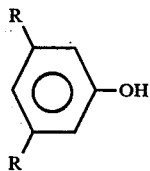 [VI]

wherein R stands for a hydrogen atom, an alkyl group having 1 to 8 carbon atoms, a halogen atom or a hydroxyl group, and two R's may be the same or different.

As specific examples, there can be mentioned phenol, meta-substituted phenols such as m-cresol, m-ethylphenol, m-n-propylphenol, m-isopropylphenol, m-n-butylphenol, m-sec-butylphenol, m-tert-butylphenol, m-n-amylphenol, m-sec-amylphenol, m-tert-amylphenol, m-hexylphenol, m-heptylphenol, m-octylphenol, m-fluorophenol, m-chlorophenol, m-bromophenol and resorcinol, and 3,5-di-substituted phenols such as 3,5-xylenol, 3,5-diethylphenol, 3,5-diisopropylphenol, 3,5-di-sec-butylphenol, 3,5-di-tert-butylphenol, 3,5-di-sec-amylphenol, 3,5-di-tert-amylphenol, 3,5-dihexylphenol, 3,5-diheptylphenol, 3,5-dioctylphenol, 3,5-dichlorophenol, 3,5-difluorophenol, 3,5-dibromophenol and 3,5-diiodophenol. Among these trifunctional phenols, those represented by the above general formula [VI] in which one of the two groups R is a hydrogen atom and the other group R is selected from a hydrogen atom, an alkyl group having 1 to 8 carbon atoms and a chlorine atom are especially preferred, and phenols in which one of the two groups R is a hydrogen atom and the other group R is a hydrogen atom, a methyl group, an isopropyl group, a sec-butyl group, a tert-butyl group or an octyl group are particularly especially preferred.

The aldehyde component in the novolak type recurring units constituting the high-molecular-weight novolak type resin (B) is an aldehyde represented by the above-mentioned general formula [II]. As such aldehyde, there can be mentioned, for example, formaldehyde, acetaldehyde, monochloroacetaldehyde, dichloroacetaldehyde and trichloroacetaldehyde. Among these aldehydes, formaldehyde and acetaldehyde, especially formaldehyde, are preferred. The aldehyde component is present in the high-molecular-weight novolak type substituted phenolic resin in the form of an alkylidene group represented by the general formula [V].

In the present invention, the novolak type recurring units (a) consisting of the above-mentioned phenol and aldehyde components, as pointed out hereinbefore, there may be contained intervening or bridging groups (also called "chain extender component units" hereinafter) consisting of a divalent hydrocarbon group, which appear alternately in blocks of the novolak type recurring units having a number average molecular weight of 250 to 1,200. The resin of this type is characterized in that the novolak type recurring unit blocks (a) having a relatively low molecular weight and the chain extender component units (b) are alternately arranged and connected to one another, whereby the molecular weight of the resin is increased, and that the novolak type recurring unit blocks (a) are bonded to terminals of the molecule of the resin. A simplest structure of the resin of this type comprises two molecules of the novolak type recurring unit blocks (a) connected to each other through one molecule of the chain extender component unit (b), and a simple structure next to the above-mentioned simplest structure comprises 3 molecules of the novolak type recurring unit blocks (a) and two molecules of the chain extender component units (b) which are alternately arranged and connected to one another. Furthermore, there can be mentioned a structure comprising 4 molecules of the novolak type recurring unit blocks (a) and 3 molecules of the chain extender component units (b) which are similarly alternately arranged and connected to one another, and a structure comprising n molecules of the novolak type recurring unit blocks (a) and (n−1) molecules of the chain extender component units (b) which are alternately arranged and connected to one another.

The high-molecular-weight novolak type resin of the present invention has a polymer chain diagrammatically represented substantially by the following formula [VII]:

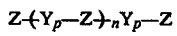 [VII]

wherein Z stands for a substantially linear novolak type recurring unit block formed by condensation of the above-mentioned phenol and aldehyde components, Y stands for an intervening group consisting of a divalent hydrocarbon group, p is a number of zero or 1, and n is zero or a number of at least 1.

In the high-molecular-weight novolak type resin of the above-mentioned type containing the chain extender component units, p is 1.

As the group Y, there can be mentioned hydrocarbon groups having 1 to 16 carbon atoms, such as alkylidene groups, alkylene groups, cycloalkylene groups, cycloalkylidene groups, arylalkylidene groups, arylalkylene groups and arylene-bis-alkylene groups [—R³—Ar—R⁴—]. As the alkylidene group, there can be mentioned, for example, methylene, ethylidene, propylidene and butylidene groups. As the alkylene group, there can be mentioned, for example, ethylene, propylene, isopropylene, butylene, pentylene and hexylene groups. As the cycloalkylene group, there can be mentioned, for example, cyclopentylene, cyclohexylene and methylcyclohexylene groups. As the cycloalkylidene group, there can be mentioned, for example, cyclopentylidene, cyclohexylidene and methylcyclohexylidene groups. As the arylalkylidene group, there can be mentioned, for example, benzylidene, o-xylidene, m-xylidene and p-xylidene groups. As the arylalkylene group, there can be mentioned, for example, styrene, α-methylstyrene and p-methylstyrene groups. As the arylene-bis-alkylene group, there can be mentioned, for example, o-xylylene, m-xylylene and p-xylylene groups. Among these chain extender component units (b), alkylidene, alkylene, cycloalkylidene, cycloalkylene, arylalkylidene, arylalkylene and arylene-bis-alkylene groups are preferred, and alkylidene groups having 1 to 4 carbon atoms, alkylene groups having 2 to 5 carbon atoms, arylalkylidene groups having 7 to 9 carbon atoms, arylalkylene groups having 8 to 10 carbon atoms and arylene-bis-alkylene groups having 8 to 10 carbon atoms are especially preferred.

When the molecular weight of these chain extender component units (b) is too high, the melting point of the resulting high-molecular-weight novolak type substituted phenolic resin is reduced but the flexibility is increased. Therefore, even if such resin is incorporated in a setting type resin, there can hardly be obtained a setting resin composition excellent in the heat resistance and mechanical properties. Accordingly, it is preferred that the molecular weight of the chain extender component unit (b) be 14 to 200 and especially 14 to 170.

The high-molecular-weight novolak type resin used in the present invention is prepared according to a process comprising reacting (A) (i) a phenol comprised mainly of at least one bifunctional phenol represented by the following general formula [I]:

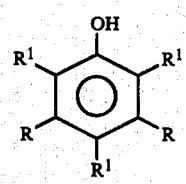

wherein two of three R¹'s are hydrogen atoms and the remaining one R¹ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, or (ii) a novolak type substituted phenolic resin consisting of a phenol comprised mainly of said bifunctional phenol and an aldehyde represented by the following general formula:

$$R^2—CHO \qquad [II]$$

wherein R² stands for a hydrogen atom or a substituent selected from the group consisting of a methyl group and a halogenated methyl group, and having a number average molecular weight of from 250 to 1200, with (B) a chain extender selected from a group consisting of (i) dimethylolated products of bifunctional phenols, (ii) resol type substituted phenolic resins consisting of a phenol comprised mainly of said bifunctional phenol and said aldehyde and having a number average molecular weight of from 250 to 1200, (iii) aldehydes, (iv) ketones, (v) diols and (vi) dihalides, with the proviso that when the reactant (A) is the phenol (i), the chain extender (B) is the resol type substituted phenol resin (ii), in the presence of an acid catalyst, so that at least 70 mole % of the phenol component in the final novolak type substituted phenolic resin is occupied by said bifunctional phenol, until the number average molecular weight of the final novolak type substituted phenolic resin is at least 1500 as measured by the vapor pressure osmometry in N,N-dimethylacetamide as the solvent.

The above-mentioned substantially linear, high-molecular-weight novolak type substituted phenolic resin is incorporated in the setting type resin composition of the present invention in an amount of 10 to 200 parts by weight per 100 parts by weight of the setting type resin. In order to highly improve the heat resistance and mechanical characteristics of the setting type resin composition of the present invention, it is preferred that the novolak type high-molecular-weight resin be incorporated in an amount of 30 to 150 parts by weight per 100 parts by weight of the setting type resin.

An inorganic filler (C) is incorporated into the setting type resin composition of the present invention according to need. As the inorganic filler, there can be mentioned, for example, silica, silica-alumina, alumina, glass powder, glass beads, glass fibers, asbestos, mica, graphite, carbon fibers, titanium oxide, molybdenum disulfide, beryllium oxide, magnesium oxide, clacium oxide, magnesium hydroxide, calcium hydroxide, talc, celite, metal powder and metal fibers. When these inorganic fillers are incorporated, the effect of improving the heat resistance and mechanical characteristics can be enhanced in each case. Moreover, if glass fiber, carbon fiber or asbestos is incorporated as the inorganic filler, mechanical strength characteristics such as impact strength and compression strength can be improved, and if graphite, titanium oxide or molybdenum disulfide is incorporated as the inorganic filler, the abrasion resistance is improved. Furthermore, if mica, asbestos or glass powder is incorporated, the arc resistance is improved, and if carbon black, metal fiber, metal powder or graphite is incorporated, electric properties such as the electric conductivity are improved. Still further, if alumina, titanium oxide or beryllium oxide is incorporated, the heat conductivity is improved. The amount incorporated of the inorganic filler is greatly changed according to the kind of the setting type resin incorporated in the setting type resin composition, the kind of the filler and the intended use of the setting type resin composition. However, the inorganic filler is ordinarily incorporated in an amount of 10 to 250 parts by weight, preferably 30 to 200 parts by weight, especially preferably 60 to 150 parts by weight, per 100 parts by weight of the setting type resin.

Various additives may be incorporated into the setting type resin composition of the present invention comprising the setting type resin (A), the substantially linear, high-molecular-weight novolak type resin (B) and the inorganic filler (C) according to need. For example, in the case where the setting type resin is one capable of being cured by a curing agent, an appropriate curing agent, a curing promotor, a thermal stabilizer, an antioxidant, a lubricant and a filler other than the above-mentioned inorganic filler are incorporated according to need. Even when the above-mentioned high-molecular-weight novolak type resin (B), which is an indispensable component of the setting type resin composition of the present invention, can be a curing agent for the setting type resin (A), a curing agent other than the novolak type resin (B) may be added according to need. In the case where the high-molecular-weight novolak type resin (B) cannot be a curing agent for the setting type resin (A), a curing agent such as mentioned above is ordinarily incorporated. These additives to be added according to need are appropriately selected and used according to the kind of the setting type resin and the intended use of the resulting setting type resin compositions, and the amounts incorporated of these additives are appropriately determined depending on the kind of the setting type resin and the intended used of the resulting setting type resin composition.

The setting type resin composition of the present invention is characterized in that the heat resistance and mechanical characteristics at high temperatures such as heat distortion temperatures, the heat distortion resistance, flexural strength, mechanical strength and dimension stability, are remarkably improved.

The present invention will now be described in detail with reference to the following Examples that by no means limit the scope of the present invention.

REFERENTIAL EXAMPLE 1

A reaction vessel was charged with 100 g of a linear low-molecular-weight novolak type p-cresol/formaldehyde resin ($\overline{M}n = 510$) obtained according to the conventional process, 31.1 g of 2,6-dimethylol-p-cresol, 0.28 ml of 60% nitric acid and 100 ml of o-dichlorobenzene, and reaction was carried out at 175° C. for 4 hours under stirring. The reaction mixture was thrown into 1 l of methanol, and after removal of the unreacted substances, the reaction product was dried to obtain 120 g (the yield being 97%) of a resin. The number average molecular weight $\overline{M}n$ was 5550 as measured according to the vapor pressure osmometry (in dimethylacetamide at 90° C.). The molecular weight distribution ($\overline{M}w/\overline{M}n$) of the resin as determined according to gel permeation chromatography was 6.2 and the melting point of the resin as measured by the microscopic method was higher than 300° C.

Data of $^1H$ nuclear magnetic resonance spectrum of the resin as determined in pyridine-$d_5$ are shown in Table 1. From the data, the presence of the methylene proton of the methylol group in the vicinity of the $\zeta$ value of 5.3 was not observed. Accordingly, it was confirmed that the obtained resin is a novolak type p-cresol/formaldehyde resin having a linear structure in which the p-cresol units and the methylene units are alternately arranged. Since the resin was completely dissolved in dimethylacetamide, it was confirmed that a three-dimensional crosslinked structure (gelled portion) is not present.

TABLE 1

| $\zeta$ Value | Attribution | Intensity Ratio |
|---|---|---|
| 7.9 | —CH$_3$ | 10.0 |
| 6.2 | —CH$_2$— | 5.0 |
| 3.1–3.2 | 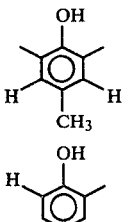 | 7.5 |
| 3.0 | | |
| 1.75 | 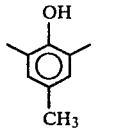 | 3.0 |

REFERENTIAL EXAMPLES 2 THROUGH 4

Procedures of Referential Example 1 were repeated in the same manner except that a low-molecular-weight novolak type o-cresol/formaldehyde (Referential Example 2), p-tert-butylphenol/formaldehyde (Referential Example 3) or p-chlorophenol/formaldehyde resin (Referential Example 4) was used instead of the low-molecular-weight novolak type p-cresol/formaldehyde resin used in Referential Example 1. The number average molecular weight Mn and structure of each of the obtained resins were determined according to the same methods as described in Referential Example 1. It was found that each of the obtained resins is a novolak type substituted phenol/formaldehyde resin having a linear structure in which the phenol units and the methylene units are alternately arranged, as in the product of Referential Example 1. Since each of these resins was completely dissolved in dimethylacetamide, it was confirmed that a three-dimensional crosslinked structure (gelled portion) is not present in any of the obtained resins. Properties of these resins are shown in Table 2.

TABLE 2

| | Starting Novolak Type Substituted Phenolic Resin | | | Formed Resin | | Properties of Formed Resin | | | |
|---|---|---|---|---|---|---|---|---|---|
| Example No. | Kind | $\overline{M}n$ | Amount (g) | Amount (g) | Yield (%) | $\overline{M}n$ | $\overline{M}w/\overline{M}n$ | Melting Point (°C.) | Structure |
| 2 | o-cresol/formaldehyde resin | 550 | 100 | 121 | 100 | 1930 | 3.23 | 134 | linear |
| 3 | p-tert-butylphenol/formaldehyde resin | 450 | 104 | 125 | 100 | 2510 | 1.70 | 200 | " |
| 4 | p-chlorophenol/ | 430 | 104 | 120 | 96 | 2100 | 1.88 | 230 | " |

TABLE 2-continued

| Example No. | Starting Novolak Type Substituted Phenolic Resin | | | Formed Resin | | Properties of Formed Resin | | | | |
|---|---|---|---|---|---|---|---|---|---|---|
| | Kind | Mn | Amount (g) | Amount (g) | Yield (%) | Mn | Mw/Mn | Melting Point (°C.) | Structure | |
| | formaldehyde resin | | | | | | | | | |

REFERENTIAL EXAMPLES 5 AND 6

Procedures of Referential Example 1 were repeated in the same manner except that 100 g of the novolak type m-cresol/p-cresol/formaldehyde copolycondensed resins shown in Table 3 were used instead of the novolak type p-cresol/formaldehyde resin. The structures of the obtained resins were determined according to the method described in Referential Example 1.

The number average molecular weight (Mn), molecular weight distribution and melting point of the obtained resin were determined according to the vapor pressure osmometry (at 90° C. in dimethylacetamide), gel permeation chromatography and microscopic method, respectively. The ratio between the p-cresol and m-cresol units constituting the resin was determined from data of $^1$H nuclear magnetic resonance spectrum determined in pyridine-$d_5$. The obtained results are shown in Table 3.

The structures of the obtained resins were examined in the same manner as described in Referential Example 1. It was found that the resins obtained in Referential Examples 5 and 6 contain both the p-phenol and m-phenol units as the phenol units and they are novolak type substituted phenol/formaldehyde resins having a linear structure in which these phenol units and methylene units are alternately arranged and parts of the m-phenol units are branched. Since these resins were completely dissolved in dimethylacetamide, it was confirmed that these resins do not contain a three-dimensional crosslinked structure (gelled portion). The obtained results are shown in Table 4.

TABLE 3

| ζ Value | Attribution | Intensity Ratio | |
|---|---|---|---|
| | | Referential Example 5 | Referential Example 6 |
| 7.9 | —CH$_3$ | 10.0 | 10.0 |
| 6.1–6.3 | —CH$_2$— | 4.8 | 4.8 |
| 3.3–3.4 | OH (with H, CH$_3$ substituents) | 0.9 | 1.9 |
| 3.1–3.2 | OH (with H, H, CH$_3$ substituents) | } 6.8 | } 5.9 |
| 3.0 | OH (with H, CH$_3$ substituents) | | |
| 1.75 | OH (with CH$_3$, CH$_3$ substituents) | 2.5 | 2.5 |

TABLE 4

| Referential Example No. | Starting Novolak Type Phenol/Formaldehyde Resin | | | | Amount (g) of Formed Resin | Properties of Formed Resin | | | | | |
|---|---|---|---|---|---|---|---|---|---|---|---|
| | Kind | Phenol Composition (mole %) | | Mn | | Phenol Composition (mole %) | | Mn | Mw/Mn | Melting Point (°C.) | Structure |
| | | p-cresol | m-cresol | | | p-cresol | m-cresol | | | | |
| 5 | m-cresol/p-cresol/formaldehyde copolycondensed resin | 88 | 12 | 380 | 112 | 89 | 11 | 2190 | 4.7 | 72.80 | partially branched linear structure |
| 6 | m-cresol/p-cresol/formaldehyde copolycondensed resin | 76 | 24 | 550 | 105 | 79 | 21 | 2310 | 4.8 | 72.80 | partially branched linear structure |

REFERENTIAL EXAMPLE 7

A reaction vessel equipped with a thermometer, a stirrer and a reflux cooler was charged with 94 g (1 mole) of phenol, 70 g (0.86 mole) of 37% formalin and 1 ml (0.274 millimole) of 1% by weight hydrochloric acid, and the mixture was heated and stirred and reaction was conducted for 4 hours from the point of initiation of refluxing. Then, 1 g (5.3 millimoles) of p-toluenesulfonic acid was added to the reaction mixture and a device for dehydration under reduced pressure was attached to the reaction vessel. Removal of water and phenol was conducted under heating under a reduced pressure of 10 mmHg until the temperature of the reaction product was 180° C. As the result, 88 g (the yield being 84%) of a brown solid resin was obtained. It was found that 36% by weight of the obtained resin is insoluble in N,N-dimethylacetamide and the resin contains a gelled portion (three-dimensional crosslinked structure). It also was found that the remaining 74% by weight of the resin is soluble in N,N-dimethylacetamide and consists of a novolak type phenol/formaldehyde resin having a branched chain structure. The average molecular weight $\overline{Mn}$ of this branched novolak type phenol/formaldehyde resin was 1090 as determined according to the vapor pressure osmometry.

REFERENTIAL EXAMPLE 8

A reaction vessel equipped with a thermometer, a stirrer and a reflux cooler was charged with 94 g (1 mole) of phenol, 70 g (0.86 mole) of 37% formalin and 1 ml (0.274 millimole) of 1% by weight hydrochloric acid, and the mixture was heated and stirred and reaction was conducted for 4 hours from initiation of refluxing. Then, 1 g (5.3 millimoles) of p-toluene-sulfonic acid was added to the reaction mixture and a device for dehydration under reduced pressure was attached to the reaction vessel. Removal of water and phenol was conducted under heating under a reduced pressure of 10 mmHg until the temperature of the reaction product was 180° C. and removal of water and phenol was then conducted for another 30 minutes. As the result, 70 g (the yield being 67%) of a brown solid resin was obtained. It was found that 58% by weight of the obtained resin is insoluble in N,N-dimethylacetamide and the resin contains a gelled portion (three-dimensional crosslinked structure). It also was found that the remaining 42% by weight of the resin is soluble in N,N-dimethylacetamide and consists of a novolak type phenol/formaldehyde resin having a branched chain structure. The average molecular weight $\overline{Mn}$ of this branched novolak type phenol/formaldehyde resin was 470 as determined according to the vapor pressure osmometry.

REFERENTIAL EXAMPLE 9

A reaction vessel equipped with a thermometer, a stirrer and a reflux cooler was charged with 108 g (1 mole) of p-cresol, 70 g (0.86 mole) of 37% formalin and 1 ml (0.274 millimole) of 1% by weight hydrochloric acid, and the mixture was heated and stirred and reaction was conducted for 4 hours from initiation of refluxing. Then, 1 g (5.3 millimiles) of p-toluene-sulfonic acid was added to the reaction mixture and a device for dehydration under reduced pressure was attached to the reaction vessel. Removal of water and p-cresol was conducted under heating under a reduced pressure of 10 mmHg until the temperature of the reaction product was 180° C. As the result, 89 g (the yield being 75%) of a brown solid resin was obtained. Since the obtained resin was completely dissolved in N,N-dimethylacetamide, it was confirmed that the resin is free of a three-dimensional crosslinked structure (gelled portion). It was confirmed that the obtained resin is a novolak type p-cresol/formaldehyde resin having a linear molecular structure. The number average molecular weight Mn of the obtained resin was 670 as determined according to the vapor pressure osmometry.

REFERENTIAL EXAMPLE 10

An autoclave having a capacity of 500 ml was charged with 100 g of a low-molecular-weight novolak type p-cresol/formaldehyde resin ($\overline{Mn}=510$, $\overline{Mw}/\overline{Mn}=1.4$, melting point$=83°$ C.) prepared according to the conventional method, 27.6 g of p-xylylene glycol, 0.28 ml of 60% nitric acid and 270 ml of toluene, and reaction was carried out at 175° C. under stirring for 4 hours. The reaction mixture was dissolved in 1 l of methanol to remove unreacted substances, and the reaction product was dried to obtain 72 g (the yield being 60%). The number average molecular weight $\overline{Mn}$ of the obtained resin was 2000 as determined according to the vapor pressure osmometry in dimethylacetamide at 90° C., and the molecular weight distribution $\overline{Mw}/\overline{Mn}$ of the resin was 2.5 as determined according to gel permeation chromatography The melting point of the resin was higher than 300° C. as determined according to the microscopic method. The structure of the resin was examined by $^1H$ nuclear magnetic resonance spectrum in pyridine-d$_5$. It was found that the resin has a novolak type p-cresol/formaldehyde resin skeleton. Since a high-molecular-weight resin different from the starting resin was formed, it was confirmed that the starting low-molecular-weight novolak type p-cresol/formaldehyde resin was reacted with p-xylylene glycol and the molecular weight was increased by alternate arrangement and connection of the starting novolak type p-cresol/formaldehyde units and p-xylylene units, and that novolak type p-cresol/formaldehyde resin units were connected to the molecule terminals of the formed resin. Since the formed resin was completely dissolved in dimethylacetamide, tetrahydrofuran and the like, it was confirmed that the formed resin is free of a three-dimensional crosslinked structure (gelled portion) and is substantially linear.

REFERENTIAL EXAMPLES 11 THROUGH 18

Procedures of Referential Example 10 were repeated in the same manner except that a chain extender shown in Table 5 was used instead of p-xylylene glycol used in Referential Example 10. The number average molecular weights Mn and structures of the obtained resins were determined according to the methods described in Referential Example 10. In each of the obtained resins, it was confirmed that the molecule terminals of the starting novolak type p-cresol/formaldehyde resin were reacted with the chain extender shown in Table 5 and the molecular weight as increased by alternate arrangement and connection of the novolak type p-cresol/formaldehyde resin units and the units of the chain extender shown in Table 5. It also was confirmed that the novolak type p-cresol/formaldehyde resin units were connected to the molecule terminals of the formed resin. Since the formed resin was completely dissolved in dimethylacetamide, tetrahydrofuran and the like, it was confirmed that each of the formed resins is free of a three-dimensional crosslinked structure (gelled portion) and is substantially linear. Properties of the obtained resins are shown in Table 5.

TABLE 5

| Referential Example No. | Chain Extender Kind | Chain Extender Amount (g) | Formed Resin Amount (g) | Formed Resin Yield (%) | Chain Extender Unit | Properties of Formed Resin Mn | Properties of Formed Resin Mw/Mn | Properties of Formed Resin Melting Point (°C.) | Structure |
|---|---|---|---|---|---|---|---|---|---|
| 11 | ethylene glycol | 12.4 | 64 | 61 | —CH$_2$CH$_2$— | 2000 | 2.5 | >300 | linear |

TABLE 5-continued

| Referential Example No. | Chain Extender Kind | Amount (g) | Formed Resin Amount (g) | Yield (%) | Chain Extender Unit | Properties of Formed Resin | | | |
|---|---|---|---|---|---|---|---|---|---|
| | | | | | | $\overline{Mn}$ | $\overline{Mw}/\overline{Mn}$ | Melting Point (°C.) | Structure |
| 12 | acetone | 11.6 | 73 | 68 | $-\underset{\underset{CH_3}{\mid}}{\overset{\overset{CH_3}{\mid}}{C}}-$ | 2050 | 2.1 | >300 | " |
| 13 | p-xylene dichloride | 35.0 | 79 | 62 | $-H_2C-\phantom{}\!\!\bigcirc\!\!\phantom{}-CH_2-$ | 2370 | 2.1 | >300 | " |
| 14 | propylene glycol | 16.0 | 73 | 68 | $\underset{-CH_2-CH_2-}{\overset{CH_3}{\mid}}$ | 2100 | 2.1 | >300 | " |
| 15 | cyclohexylene glycol | 23.2 | 78 | 67 | (cyclohexylene) | 2400 | 2.6 | >300 | " |
| 16 | cyclohexanone | 18.6 | 71 | 62 | (cyclohexylidene) | 2100 | 2.1 | >300 | " |
| 17 | acetophenone | 23.2 | 72 | 60 | (CH₃-C-cyclohexyl) | 2050 | 2.1 | >300 | " |
| 18 | styrene dichloride | 35.0 | 78 | 65 | $-CH_2-CH-\phantom{}\!\!\bigcirc\!\!\phantom{}$ | 2200 | 2.4 | >300 | " |

REFERENTIAL EXAMPLES 19 THROUGH 21

Procedures of Referential Example 10 were repeated in the same manner except that a novolak type o-cresol/formaldehyde resin, a novolak type p-tert-butylphenol/formaldehyde resin, and a novolak type p-chlorophenol/formaldehyde resin were used as shown in Table 6 instead of the novolak type p-cresol/formaldehyde resin used in Referential Example 10. The number average molecular weights $\overline{Mn}$ and molecular weight distributions $\overline{Mw}/\overline{Mn}$ of the obtained resins were determined in the same manner as described in Referential Example 10. The structures of the formed resins were examined in the same manner as described in Referential Example 10 and it was confirmed that in each of the obtained resins, the molecule terminals of the starting novolak type substituted phenol/formaldehyde resin were reacted with p-xylylene glycol and the molecular weight was increased by alternate arrangement and connection of the novolak substituted phenol/formaldehyde resin units and the p-xylylene units, and that the novolak type substituted phenol/formaldehyde resin units were connected to the molecule terminals of the formed resin. Since the obtained resins were completely dissolved in dimethylacetamide, tetrahydrofuran and the like, it was confirmed that each of the formed resins is free of a three-dimensional crosslinked structure (gelled portion) and is substantially linear. Properties of the so obtained resins are shown in Table 6.

TABLE 6

| Referential Example No. | Starting Novolak Type Substituted Phenolic Resin | | | | | Formed Resin | | Properties of Formed Resin | | | | |
|---|---|---|---|---|---|---|---|---|---|---|---|---|
| | Kind | Amount (g) | $\overline{Mn}$ | $\overline{Mw}/\overline{Mn}$ | Melting Point (°C.) | amount (g) | yield (%) | Chain Extender Component Unit | $\overline{Mn}$ | $\overline{Mw}/\overline{Mn}$ | Melting Point (°C.) | Structure |
| 19 | o-cresol/formaldehyde resin | 100 | 550 | 1.58 | 60–68 | 72 | 60 | $-H_2C-\phantom{}\!\!\bigcirc\!\!\phantom{}-CH_2-$ | 1900 | 2.7 | 130 | linear |
| 20 | p-tert-butylphenol/formaldehyde resin | 104 | 450 | 1.41 | 62–70 | 78 | 63 | $-H_2C-\phantom{}\!\!\bigcirc\!\!\phantom{}-CH_2-$ | 2020 | 1.7 | 190 | " |
| 21 | p-chlorophenol/formaldehyde resin | 104 | 430 | 1.88 | 70–81 | 80 | 64 | $-H_2C-\phantom{}\!\!\bigcirc\!\!\phantom{}-CH_2-$ | 2000 | 1.8 | 220 | " |

REFERENTIAL EXAMPLES 22 AND 23

Procedures of Referential Example 10 were repeated in the same manner except that 100 g of a low-molecular-weight novolak type m-cresol/p-cresol/formaldehyde copolycondensed resin having a linear structure including branches was used instead of the low-molecular-weight novolak type p-cresol/formaldehyde resin. The structures of the obtained resins were examined in the same manner as described in Referential Example 10. It was confirmed that in each of the obtained resins, a novolak type m-cresol/p-cresol/formaldehyde copolycondensed resin skeleton was present. Since a high-molecular-weight resin different from the starting resin was formed, it was confirmed that the starting low-molecular-weight novolak type m-cresol/p-cresol/formaldehyde copolycondensed resin was reacted with p-xylylene glycol, and that the molecular weight was increased by alternate arrangement and connection of the novolak type m-cresol/p-cresol/formaldehyde copolycondensed resin units and p-xylylene units. It also was formed that the novolak type m-cresol/p-cresol/formaldehyde resin units were connected to the molecule terminals of the formed resin. Since these resins were completely dissolved in dimethylacetamide, tetrahydrofuran and the like, it was confirmed that each of these resins is free of a three-dimensional crosslinked structure (gelled portion) and is substantially linear. Properties of the obtained resins are shown in Table 7.

Method (A) of Preparation of Setting Type Resin Compositions

A mixture comprising 15 g of the novolak type substituted phenolic resin shown in Table 8, 25 g of a bisphenol A type epoxy resin (EPOMIK R-301 manufactured and supplied by Mitsui Petrochemical-Epoxy Co.), 150 g of fused silica, 0.25 g of a $BF_2.2$-methylimidazole complex and 0.75 g of a montanic acid wax was kneaded on a roll maintained at 80° C. for 7 minutes. After cooling, the kneaded mixture was pulverized to particles having a size of 7 to 100 mesh, and the pulverization product was press-molded in a mold maintained at 250° C. for 20 minutes under 100 $Kg/cm^2$ (actual pressure). The molded composition was post-cured at 250° C. for 30 minutes. The physical properties of the molded product were measured to obtain results shown in Table 8.

Method (B) of Preparation of Setting Type Resin Compositions

A mixture comprising 15 g of the novolak type substituted phenolic resin shown in Table 8, 25 g of a bisphenol A type epoxy resin (EPOMIK R-301 manufactured and supplied by Mitsui Petrochemical-Epoxy Co.), 95 g of fused silica 0.25 g of a $BF_3.2$-methylimidazole complex and 0.75 g of a montanic acid wax was kneaded on a roll maintained at 80° C. for 7 minutes. After cooling, the kneaded mixture was pulverized to particles having a size of 7 to 100 mesh, and the pulverized composition was press-molded in a mold maintained at 250° C. for 20

TABLE 7

| | | Properties of Starting Novolak Type Substituted Phenolic Resin | | | | | |
|---|---|---|---|---|---|---|---|
| Referential Example No. | Starting Novolak Resin | Phenol Composition (mole %) | | $\overline{Mn}$ | $\overline{Mw}/\overline{Mn}$ | Melting Point (°C.) | Structure |
| | | p-cresol | m-cresol | | | | |
| 22 | m-cresol/p-cresol/formaldehyde copolycondensed resin | 88 | 12 | 380 | 2.1 | 60–70 | linear structure including branches |
| 23 | m-cresol/p-cresol/formaldehyde copolycondensed resin | 76 | 24 | 550 | 18.9 | 100–125 | linear structure including branches |

| | Formed resin | | Properties of Formed Resin | | | Melting | |
|---|---|---|---|---|---|---|---|
| Referential Example No. | Amount (g) | Yield (%) | Chain Extender Component Unit | $\overline{Mn}$ | $\overline{Mw}/\overline{Mn}$ | Point (°C.) | Structure |
| 22 | 72 | 60 | $-CH_2-\bigcirc-CH_2-$ | 2010 | 2.8 | >280 | linear structure including branches |
| 23 | 78 | 63 | '' | 2130 | 3.7 | >280 | linear structure including branches | minutes under 100 $Kg/cm^2$ (actual pressure). The molded composition was post-cured for 30 minutes, and the physical properties of the molded product were determined to obtain results shown in Table 8.

EXAMPLES 1 THROUGH 38 AND COMPARATIVE EXAMPLES 1 THROUGH 12

The high-molecular-weight novolak type substituted phenolic resins obtained in Referential Examples 1 through 23 and ordinary low-molecular-weight novolak type substituted phenolic resins used as the starting materials in these Referential Examples were incorporated in setting type resins, and properties of the resulting setting resin compositions were examined and evaluated. The setting resin compositions used for evaluation of the properties were prepared according to any of the following methods [see Table 8].

Method (C) of Preparation of Setting Type Resin Compositions

A mixture comprising 37 g of the high-molecular-weight p-cresol/formaldehyde resin shown in Table 8, 63 g of a bisphenol A type epoxy resin (EPOMIK R-140 manufactured and supplied by Mitsui Petrochemical-Epoxy Co.) and 0.1 g of 2-methylimidazole was dissolved in a mixed solvent comprising 25 g of methylethyl ketone and 5 g of methanol, and a glass cloth (Glass Cloth WE-18K-BZ2 manufactured and supplied by Nittobo Co.) was impregnated with the so formed varnish and press-molded at 170° C. for 1 hour. The press-molded product was post-cured at 180° C. for 8 hours to obtain a laminate sheet. The flexural strength of the laminate sheet was measured at 21, 150° and 180° C. to obtain results shown in Table 8.

Method (D) of Preparation of Setting Type Resin Compositions

A mixture comprising the novolak type substituted phenolic resin shown in Table 8, 25 g of a novolak type phenol-epoxy resin (Epoxylated Phenol Novolak EPPN-201 manufactured and supplied by Nippon Chemical Co.), 95 g of fused silica, 0.25 g of a $BF_3.2$-methylimidazole complex and 0.75 g of a montanic acid wax was kneaded on a roll maintained at 80° C. for 7 minutes. After cooling, the kneaded mixture was pulverized to particles having a size of 7 to 100 mesh, and the pulverized composition was press-molded in a mold maintained at 250° C. for 20 minutes under 100 $Kg/cm^2$ (actual pressure). The press-molded composition was post-cured at 250° C. for 30 minutes, and the physical properties of the obtained molded product were measured to obtain results shown in Table 8.

Method (E) of Preparation of Setting Type Resin Compositions

A mixture comprising 15 g of the novolak type substituted phenolic resin shown in Table 8, 25 g of a bisphenol A type epoxy resin (EPOMIK R-301 manufactured and supplied by Mitsui Petrochemical-Epoxy Co.), 27 g of an inorganic filler shown in Table 8, 0.25 g of a $BF_3.2$-methylimidazole complex and 0.75 g of a montanic acid wax was kneaded on a roll maintained at 80° C. for 7 minutes. After cooling, the kneaded composition was pulverized to particles having a size of 7 to 100 mesh, and the pulverized composition was press-molded in a mold maintained at 80° C. for 20 minutes under 100 $Kg/cm^2$ (actual pressure). The press-molded product was post-cured at 250° C. for 30 minutes, and the physical properties of the molded product were determined to obtain results shown in Table 8.

Method (F) of Preparation of Setting Type Resin Compositions

A mixture comprising 100 g of the novolak type substituted phenolic resin shown in Table 8, 63 g of a bisphenol A type epoxy resin (EPOMIK R-140 manufactured and supplied by Mitsui Petrochemical-Epoxy Co.) and 1 g of a $BF_3.2$-methylimidazole complex was kneaded and press-molded in a mold maintained at 200° C. under 100 $Kg/cm^2$ (actual pressure) for 20 minutes. The press-molded composition was post-cured at 200° C. for 5 hours and reacted at 250° C. for 0.5 hour to form a cured molded product having physical properties shown in Table 8.

Method (G) of Preparation of Setting Type Resin Compositions

A mixture comprising 40 g of the novolak type substituted phenolic resin shown in Table 8, 60 g of the novolak type phenol-formaldehyde resin obtained in Comparative Example 2 (in Comparative Example 11, the novolak type substituted phenolic resin was not used, but 100 g of the novolak type phenol/aldehyde resin obtained in Comparative Example 2 was used), 10 g of hexamine as a curing agent, 67 g of wood flour as a filler and 1 g of stearic acid bisamide as an additive was sufficiently pulverized and blended and kneaded at 90° to 100° C. for 18 minutes to form a sheet. The sheet was pulverized and blended to form a molding material. The molding material was molded at 165° C. under 300 $Kg/cm^2$ for 5 minutes to obtain a molded product having physical properties shown in Table 8.

Method (H) of Preparation of Setting Type Resin Compositions

A molding material composition was prepared by blending 70 g of the novolak type substituted phenolic resin shown in Table 8, 30 g of a solid resol type phenol-formaldehyde resin prepared in Referential Example 24 illustrated hereinafter, 67 g of wood fluor as a filler and 1 g of stearic acid bisamide as an additive. The composition was sufficiently pulverized and blended and roll-kneaded at 120° C. for 15 minutes. The obtained sheet was pulverized and blended, and the resulting molding material was molded at 180° C. under 300 $Kg/cm^2$ for 5 minutes to obtain a molded product having physical properties shown in Table 8.

REFERENTIAL EXAMPLE 24

A reaction vessel was charged with 100 g (1.1 moles) of phenol, 90 g (1.1 moles as HCHO) of 37% formalin and 0.5 g of 25% aqueous ammonia, and reaction was carried out under reflux at 90° to 100° C. for 1.5 hours. The temperature was lowered to room temperature, and the separated water layer was removed. The obtained precondensate emulsion was heated again at 90° to 110° C. and water was removed under reduced pressure. When the temperature of the reaction product was 110° C., the reaction product was taken out from the reaction vessel and cooled and solidified to obtain 100 g of a resin. From the results obtained according to the vapor pressure osmometry and gel permeation chromatography, it was found that the obtained resin had a number average molecular weight $\overline{Mn}$ of 440, a weight average molecular weight $\overline{Mw}$ of 740 and a molecular weight distribution $\overline{Mw}/\overline{Mn}$ of 1.69. The melting point of the resin was 105° C. as determined according to the microscopic method.

TABLE 8

| Example No. | Novolak Type Substituted Phenolic Resin | | | | Setting Resin | | |
|---|---|---|---|---|---|---|---|
| | Preparation Example No. | Kind | $\overline{Mn}$ | Kind | Curing Promotor | Curing Agent |
| 1 | Referential Example 1 | high-molecular-weight novolak type p-cresol/formaldehyde resin | 5550 | epoxy resin | $BF_3.2$-methylimidazole complex | — |
| Comparative Example 1 | Starting Material of Referential Example 1 | novolak type p-cresol/formaldehyde resin | 510 | epoxy resin | $BF_3.2$-methylimidazole complex | — |
| 2 | Referential Example 1 | high-molecular-weight novolak type p-cresol/formaldehyde resin | 5550 | epoxy resin | $BF_3.2$-methylimidazole complex | — |

TABLE 8-continued

| | | | | | | |
|---|---|---|---|---|---|---|
| 3 | Referential Example 2 | high-molecular-weight novolak type o-cresol/formaldehyde resin | 1930 | epoxy resin | BF$_3$.2-methyl-imidazole complex | — |
| 4 | Referential Example 3 | high-molecular-weight novolak type p-tert-butylphenol/formaldehyde resin | 2510 | epoxy resin | BF$_3$.2-methyl-imidazole complex | — |
| 5 | Referential Example 4 | high-molecular-weight novolak type p-chlorophenol/formaldehyde resin | 2100 | epoxy resin | BF$_3$.2-methyl-imidazole complex | — |
| 6 | Referential Example 5 | high-molecular-weight novolak type m-cresol/p-cresol/formaldehyde resin | 2190 | epoxy resin | BF$_3$.2-methyl-imidazole complex | — |
| Comparative Example 2 | Starting Material of Referential Example 1 | novolak type p-cresol/formaldehyde resin | 510 | epoxy resin | BF$_3$.2-methyl-imidazole complex | — |
| Comparative Example 3 | Starting Material of Referential Example 2 | novolak type o-cresol/formaldehyde resin | 550 | epoxy resin | BF$_3$.2-methyl-imidazole complex | — |
| Comparative Example 4 | Starting Material of Referential Example 3 | novolak type p-tert-butylphenol/formaldehyde resin | 450 | epoxy resin | BF$_3$.2-methyl-imidazole complex | — |
| Comparative Example 5 | Starting Material of Referential Example 4 | novolak type p-chlorophenol/formaldehyde resin | 430 | epoxy resin | BF$_3$.2-methyl-imidazole complex | — |
| Comparative Example 6 | Starting Material of Referential Example 5 | novolak type m-cresol/p-cresol/formaldehyde copolycondensed resin | 380 | epoxy resin | BF$_3$.2-methyl-imidazole complex | — |
| Comparative Example 7 | Referential Example 7 | novolak type phenol/formaldehyde resin | 1090 | epoxy resin | BF$_3$.2-methyl-imidazole complex | — |
| 7 | Referential Example 1 | high-molecular-weight novolak type p-cresol/formaldehyde resin | 5550 | epoxy resin | BF$_3$.2-methyl-imidazole complex | — |
| 8 | Referential Example 1 | high-molecular-weight novolak type p-cresol/formaldehyde resin | 5550 | epoxy resin | 2-methyl-imidazole | — |
| Comparative Example 8 | Starting Material of Referential Example 1 | novolak type p-cresol/formaldehyde resin | 510 | epoxy resin | 2-methyl-imidazole | — |
| 9 | Referential Example 1 | high-molecular-weight novolak type p-cresol/formaldehyde resin | 5550 | epoxy resin | BF$_3$.2-methyl-imidazole complex | — |
| 10 | Referential Example 1 | high-molecular-weight novolak type p-cresol/formaldehyde resin | 5550 | epoxy resin | BF$_3$.2-methyl-imidazole complex | — |
| 11 | Referential Example 1 | high-molecular-weight novolak type p-cresol/formaldehyde resin | 5550 | epoxy resin | BF$_3$.2-methyl-imidazole complex | — |
| 12 | Referential Example 1 | high-molecular-weight novolak type p-cresol/formaldehyde resin | 5550 | epoxy resin | BF$_3$.2-methyl-imidazole complex | — |
| Comparative Example 9 | Starting Material of Referential Example 1 | novolak type p-cresol/formaldehyde resin | 510 | epoxy resin | BF$_3$.2-methyl-imidazole complex | — |
| Comparative Example 10 | Referential Example 7 | novolak type phenol/formaldehyde resin | 1090 | epoxy resin | BF$_3$.2-methyl-imidazole complex | — |
| 13 | Referential Example 1 | high-molecular-weight novolak type p-cresol/formaldehyde resin | 5550 | novolak type phenol/formaldehyde resin | — | hexamine |
| 14 | Referential Example 4 | high-molecular-weight novolak type p-chlorophenol/formaldehyde resin | 2100 | novolak type phenol/formaldehyde resin | — | " |
| Comparative Example 11 | Referential Example 7 | novolak type phenol/formaldehyde resin | 1090 | novolak type phenol/formaldehyde resin | — | " |
| 15 | Referential Example 1 | high-molecular-weight novolak type p-cresol/formaldehyde resin | 5550 | resol type phenol/formaldehyde resin | — | — |
| 16 | Referential Example 4 | high-molecular-weight novolak type p-chlorophenol/formaldehyde resin | 2100 | resol type phenol/formaldehyde resin | — | — |
| Comparative Example 12 | Referential Example 2 | novolak type phenol/formaldehyde resin | 1090 | resol type phenol/formaldehyde resin | — | — |
| 17 | Referential | high-molecular-weight | 2000 | epoxy resin | BF$_3$.2-methyl- | — |

TABLE 8-continued

| | | | | | | |
|---|---|---|---|---|---|---|
| | Example 10 | novolak type p-cresol/ formaldehyde resin | | | imidazole complex | |
| 18 | Referential Example 10 | high-molecular-weight novolak type p-cresol/ formaldehyde resin | 2000 | " | BF$_3$.2-methyl- imidazole complex | — |
| 19 | Referential Example 11 | high-molecular-weight novolak type p-cresol/ formaldehyde resin | 2000 | " | BF$_3$.2-methyl- imidazole complex | — |
| 20 | Referential Example 12 | high-molecular-weight novolak type p-cresol/ formaldehyde resin | 2050 | " | BF$_3$.2-methyl- imidazole complex | — |
| 21 | Referential Example 13 | high-molecular-weight novolak type p-cresol/ formaldehyde resin | 2370 | " | BF$_3$.2-methyl- imidazole complex | — |
| 22 | Referential Example 14 | high-molecular-weight novolak type p-cresol/ formaldehyde resin | 2100 | " | BF$_3$.2-methyl- imidazole complex | — |
| 23 | Referential Example 15 | high-molecular-weight novolak type p-cresol/ formaldehyde resin | 2400 | " | BF$_3$.2-methyl- imidazole complex | — |
| 24 | Referential Example 16 | high-molecular-weight novolak type p-cresol/ formaldehyde resin | 2100 | " | BF$_3$.2-methyl- imidazole complex | — |
| 25 | Referential Example 17 | high-molecular-weight novolak type p-cresol/ formaldehyde resin | 2050 | " | BF$_3$.2-methyl- imidazole complex | — |
| 26 | Referential Example 18 | high-molecular-weight novolak type p-cresol/ formaldehyde resin | 2200 | " | BF$_3$.2-methyl- imidazole complex | — |
| 27 | Referential Example 19 | high-molecular-weight novolak type o-cresol/ formaldehyde resin | 1900 | epoxy resin | BF$_3$.2-methyl- imidazole complex | — |
| 28 | Referential Example 20 | high-molecular-weight novolak type p-tert- butylphenol/formalde- hyde resin | 2020 | epoxy resin | BF$_3$.2-methyl- imidazole complex | — |
| 29 | Referential Example 21 | high-molecular-weight novolak type p-chloro- phenol/formaldehyde resin | 2000 | epoxy resin | BF$_3$.2-methyl- imidazole complex | — |
| 30 | Referential Example 22 | high-molecular-weight novolak type m-cresol/ p-cresol/formaldehyde copoly- condensed resin | 2010 | epoxy resin | BF$_3$.2-methyl- imidazole complex | — |
| 31 | Referential Example 10 | high-molecular-weight novolak type p-cresol/ formaldehyde resin | 2000 | epoxy resin | BF$_3$.2-methyl- imidazole complex | — |
| 32 | Referential Example 10 | high-molecular-weight novolak type p-cresol/ formaldehyde resin | 2000 | epoxy resin | BF$_3$.2-methyl- imidazole complex | — |
| 33 | Referential Example 10 | high-molecular-weight novolak type p-cresol/ formaldehyde resin | 2000 | epoxy resin | BF$_3$.2-methyl- imidazole complex | — |
| 34 | Referential Example 10 | high-molecular-weight novolak type p-cresol/ formaldehyde resin | 2000 | epoxy resin | BF$_3$.2-methyl- imidazole complex | — |
| 35 | Referential Example 10 | high-molecular-weight novolak type p-cresol/ formaldehyde resin | 2000 | novolak type phenol/form- aldehyde resin | — | hexamine |
| 36 | Referential Example 21 | high-molecular-weight novolak type p-chlorophenol/ formaldehyde resin | 2000 | novolak type phenol/form- aldehyde resin | — | hexamine |
| 37 | Referential Example 10 | high-molecular-weight novolak type p-cresol/ formaldehyde resin | 2000 | resol type phenol/form- aldehyde resin | — | — |
| 38 | Referential Example 21 | high-molecular-weight novolak type p-chlorophenol/ formaldehyde resin | 2000 | resol type phenol/form- aldehyde resin | — | — |

| | | | | Physical Properties | | | |
|---|---|---|---|---|---|---|---|
| Example No. | Filler | Setting Type Resin Prepa- ration Method | Flexural Strength (Kg/cm) | Flexural Elasticity [(Kg/cm$^2$) × 10$^{-5}$] | Izod Impact Strength (Kg . cm/cm) | Rockwell Hardness (M) | Thermal Distortion Tempera- ture (°C.) |
| 1 | fused silica | A | 1290 | 1.90 | 1.7 | 111 | 288 |
| Comparative Example 1 | " | A | 890 | 1.97 | 1.5 | 105 | 101 |
| 2 | " | B | 1212 | 1.32 | 1.6 | 110 | >250 |
| 3 | " | B | 1215 | 1.24 | 1.7 | 112 | 172 |
| 4 | " | B | 1050 | 1.20 | 1.6 | 111 | 175 |
| 5 | " | B | 1420 | 1.43 | 1.6 | 113 | 195 |

TABLE 8-continued

| | | | | | | | |
|---|---|---|---|---|---|---|---|
| 6 | " | B | 1180 | 1.18 | 1.6 | 110 | >250 |
| Comparative Example 2 | " | B | 824 | 1.20 | 1.3 | 108 | 109 |
| Comparative Example 3 | " | B | 646 | 1.06 | 1.5 | 109 | 98 |
| Comparative Example 4 | " | B | 520 | 0.93 | 1.0 | 108 | 101 |
| Comparative Example 5 | " | B | 699 | 1.17 | 1.5 | 109 | 107 |
| Comparative Example 6 | " | B | 756 | 1.10 | 1.2 | 107 | 102 |
| Comparative Example 7 | " | B | 630 | 1.10 | 1.3 | 107 | 95 |
| 7 | " | D | 792(23° C.) 616(200° C.) | 1.20(23° C.) 0.76(200° C.) | 1.9 | 116 | >250 |
| 8 | glass cloth | C | 3700(21° C.) 2900(150° C.) 2200(180° C.) | — | — | — | — |
| Comparative Example 8 | " | C | 4400(21° C.) 1700(150° C.) 900(180° C.) | — | — | — | — |
| 9 | glass fiber | E | 1120 | 0.90 | 10.0 | 110 | >250 |
| 10 | asbestos | E | 720 | 0.70 | 3.0 | 110 | >250 |
| 11 | graphite | E | 640 | 0.60 | 1.6 | 110 | >250 |
| 12 | not added | F | 850 | 0.35 | 2.1 | — | 185 |
| Comparative Example 9 | " | F | 550 | 0.30 | 1.4 | — | 90 |
| Comparative Example 10 | " | F | 580 | 0.31 | 1.7 | — | 90 |
| 13 | wood flour | G | 1080 | — | 2.7 | — | 210 |
| 14 | " | G | 1010 | — | 2.6 | — | 200 |
| Comparative Example 11 | " | G | 820 | — | 2.6 | — | 160 |
| 15 | " | H | 1050 | — | 2.8 | — | 212 |
| 16 | " | H | 1040 | — | 2.6 | — | 158 |
| Comparative Example 12 | " | H | 800 | — | 2.6 | — | 158 |
| 17 | fused silica | A | 1180 | 1.90 | 1.7 | 110 | 280 |
| 18 | " | B | 1090 | 1.21 | 1.6 | 110 | >250 |
| 19 | " | B | 1050 | 1.80 | 1.8 | 102 | 240 |
| 20 | " | B | 1100 | 1.80 | 1.8 | 110 | >250 |
| 21 | " | B | 1180 | 1.90 | 1.7 | 110 | 288 |
| 22 | " | B | 1120 | 1.80 | 1.8 | 106 | 260 |
| 23 | " | B | 1210 | 2.00 | 1.7 | 112 | 286 |
| 24 | " | B | 1160 | 1.80 | 1.8 | 108 | 270 |
| 25 | " | B | 1200 | 2.00 | 1.6 | 111 | 284 |
| 26 | " | B | 1090 | 1.80 | 1.8 | 105 | 250 |
| 27 | " | B | 1090 | 1.20 | 1.7 | 112 | 168 |
| 28 | " | B | 950 | 1.05 | 1.6 | 111 | 170 |
| 29 | " | B | 1110 | 1.25 | 1.6 | 113 | 180 |
| 30 | " | B | 1050 | 1.13 | 1.6 | 110 | >250 |
| 31 | glass fiber | E | 830 | 0.80 | 11.0 | 108 | >250 |
| 32 | asbestos | E | 700 | 0.70 | 3.5 | 107 | >250 |
| 33 | graphite | E | 620 | 0.60 | 2.0 | 107 | >250 |
| 34 | not added | F | 830 | 0.33 | 2.1 | — | 182 |
| 35 | wood flour | G | 1060 | — | 2.9 | — | 206 |
| 36 | " | G | 1010 | — | 2.8 | — | 200 |
| 37 | " | H | 1030 | — | 2.6 | — | 210 |
| 38 | " | H | 1040 | — | 2.8 | — | 210 |

What we claim is:

1. A resin composition comprising (A) a thermosetting resin and (B) 10 to 200 parts by weight, per 100 parts by weight of said resin (A), of a substantially linear, high-molecular-weight novolak substituted phenolic resin which comprises substantially linear novolak type recurring units formed by condensation of a phenol component containing at least 70 mole % of at least one bifunctional phenol represented by the following general formula (I):

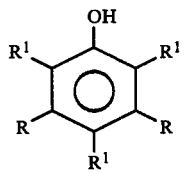

wherein two of three $R^1$'s are hydrogen atoms and the remaining one $R^1$ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, with at least one aldehyde component respresented by the following general formula (II):

$$R^2-CHO \qquad (II)$$

wherein $R^2$ stands for a hydrogen atom or a substituent selected from the group consisting of a methyl group and a halogenated methyl group, wherein said novolak substituted phenolic resin (B) may contain intervening groups consisting of a divalent hydrocarbon group, which appear alternately in blocks of said novolak type recurring units having a number average molecular weight of 250 to 1200, in an amount of 0.5 to 1 mole per mole of said blocks and wherein said novolak substituted phenolic resin has a number average molecular weight of at least 1500 as measured by the vapor pressure osmometry in N,N-dimethylacetamide as the solvent.

2. A resin composition as set forth in claim 1, wherein said high-molecular-weight novolak substituted phenolic resin (B) has a number average molecular weight of 1700 to 15000.

3. A resin composition as set forth in claim 1, wherein said high-molecular-weight novolak substituted phenolic resin (B) has a number average molecular weight of 2000 to 10000.

4. A resin composition as set forth in claim 1, wherein the molecular weight distribution $\overline{Mw}/\overline{Mn}$ of said high-molecular-weight novolak resin (B), expressed as the ratio of the weight average molcular weight $\overline{Mw}$ to the number average molecular weight $\overline{Mn}$, is in the range of from 1.8 to 20.

5. A resin composition as set forth in claim 1, wherein said high-molecular-weight novolak substituted phenolic resin (B) has a polymer chain represented substantially by the following formula (VII):

$$Z\text{-}(Y_p\text{-}Z\text{-})_n Y_p\text{-}Z \qquad (VII)$$

wherein Z stands for a substantially linear novolak type recurring unit block formed by condensation of the above-mentioned phenol and aldehyde components, Y stands for an intervening group consisting of a divalent hydrocarbon group, p is a number of zero or 1, and n is zero or a number of at least 1.

6. A resin composition as set forth in claim 5, wherein in said general formula (VII), p is 1 and the intervening group Y is an alkylidene group having 1 to 4 carbon atoms, an alkylene group having 2 to 5 carbon atoms, an arylalkylidene group having 7 to 9 carbon atoms, an arylalkylene group having 8 to 10 carbon atoms or an arylene-bis-alkylene group having 8 to 10 carbon atoms.

7. A resin composition as set forth in claim 1, wherein said phenol component constituting the high-molecular-weight novolak substituted phenolic resin (B) comprises up to 30 mole % of a trifunctional phenol.

8. A resin composition as set forth in claim 1, wherein the phenol component constituting the high-molecular-weight novolak substituted phenolic resin (B) comprises 80 to 100 mole % of a bifunctional phenol and up to 20 mole % of a trifunctional phenol with the proviso that the total amount of both the phenols is 100 mole %.

9. A resin composition as set forth in claim 1, wherein the phenol component constituting the high-molecular-weight novolak substituted phenolic resin (B) comprises 90 to 100 mole % of a bifunctional phenol and up to 10 mole % of a trifunctional phenol with the proviso that the total amount of both the phenols is 100 mole %.

10. A resin composition as set forth in claim 1, wherein the high-molecular-weight novolak substituted phenolic resin (B) is incorporated in an amount of 30 to 150 parts by weight per 100 parts by weight of the thermosetting resin (A).

11. A resin composition as set forth in claim 1, wherein the thermosetting resin (A) is a thermosetting resin capable of being cured by a compound containing a phenolic hydroxyl group and the high-molecular-weight novolak substituted phenolic resin (B) is incorporated as a curing agent for the thermosetting resin (A).

12. A resin composition as set forth in claim 1 or 11, wherein the thermosetting resin is an epoxy resin.

13. A resin composition as set forth in claim 1, wherein the thermosetting resin (A) is a resol phenolic resin or other novolak phenolic resin.

14. A resin composition as set forth in claim 1, which further comprises an inorganic filler in an amount of 10 to 250 parts by weight per 100 parts by weight of the thermosetting resin (A).

15. A thermosetting resin composition comprising (A) a thermosetting synthetic resin selected from the group consisting of epoxy resins, urethane resins, urea resins, melamine resins, polybismaleimide resins, novolak phenolic resins and resol phenolic resins and (B) 10 to 200 parts by weight, per 100 parts by weight of said resin (A), of a substantially linear, high-molecular-weight novolak substituted phenolic resin which comprises substantially linear novolak recurring units formed by condensation of a phenol component consisting of 70 to 100 mole % of at least one bifunctional phenol represented by the following general formula (I):

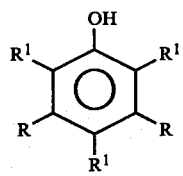

wherein two of three $R^1$'s are hydrogen atoms and the remaining one $R^1$ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, and 0 to 30 mole % of a trifunctional phenol with at least one aldehyde component represented by the following general formula (II):

$$R^2-CHO \qquad (II)$$

wherein $R^2$ stands for a hydrogen atom or a substituent selected from the group consisting of a methyl group and a halogenated methyl group, said novolak substituted phenolic resin having a polymer chain represented substantially by the following general formula (VII):

$$Z\text{+}Y_p\text{-}Z\text{+}_nY_p\text{—}Z \qquad \text{(VII)}$$

wherein Z stands for a substantially linear novolak type recurring unit block formed by condensation of the above-mentioned phenol and aldehyde components and having a number average molecular weight of 250 to 1200, Y stands for an intervening group consisting of a divalent hydrocarbon group selected from alkylidene groups having 2 to 5 carbon atoms, arylalkylidene groups having 7 to 9 carbon atoms, arylalkylene groups having 8 to 10 carbon atoms and arylenebisalkylene groups having 8 to 10 carbon atoms, which is present in an amount of 0.5 to 1 mole per mole of said blocks, p is a number of zero or 1, and n is zero or a number of at least 1, and having a number average molecular weight of at least 1500 as measured by the vapor pressure osmometry in N,N-dimethylacetamide as the solvent.

* * * * *